United States Patent [19]

Ferreira et al.

[11] Patent Number: 5,748,782
[45] Date of Patent: May 5, 1998

[54] DEVICE FOR IMPLEMENTING A MESSAGE SIGNATURE SYSTEM AND CHIP CARD COMPRISING SUCH A DEVICE

[75] Inventors: Ronald Ferreira, Paris; Joseph Hoppe, Les Molieres, both of France

[73] Assignee: De La Rue Cartes Et Systems SAS, Paris, France

[21] Appl. No.: 412,172

[22] Filed: Mar. 28, 1995

[30] Foreign Application Priority Data

Mar. 30, 1994 [FR] France .................. 94 03773

[51] Int. Cl.⁶ .................................................. G06K 9/00
[52] U.S. Cl. ................................. 382/232; 382/181
[58] Field of Search ................. 340/825.33, 825.34; 380/231, 24, 30, 49, 23, 25; 825/34; 902/26, 3; 235/380, 382.5; 382/115, 116, 117, 118, 119, 124, 125, 126, 181, 190, 209, 217, 232, 233, 235, 292, 243, 244, 248, 251, 312, 306, 305

[56] References Cited

U.S. PATENT DOCUMENTS 4,405,829 9/1983 Rivest et al. .................. 178/22.1
4,656,474 4/1987 Mollier .......................... 380/23
4,885,777 12/1989 Takaragi ........................ 380/23

FOREIGN PATENT DOCUMENTS 2620248 9/1987 France ................ G06K 9/62

OTHER PUBLICATIONS

"Comment Utiliser Les Fonctions De Condensation Dans La Protection Des Donnees", Dated Mar. 5, 1988 and Published on the Occassion of the Colloquium Securicom, Held in Paris in 1988, pp. 91–110, Campana et al.

"Enhanced Performance Single–Chip DSP Requires Minimal External Circuitry" by Daniel A. Ash, Twenty–Second Asilomar Conference on Signals, Systems and Computers, Oct. 31, 1988, pp. 885–889.

Primary Examiner—Leo Boudreau
Assistant Examiner—Bijan Tadayon
Attorney, Agent, or Firm—Oliff & Berridge PLC

[57] ABSTRACT

This provides a first device for implementing an RSA-type protected data exchange system for the signing of messages and the verification of the signed messages, and a second device for inhibiting the encryption anti decryption functions inherent of such systems so as to authorize only the signature and signature functions and public key authentication.

22 Claims, 3 Drawing Sheets

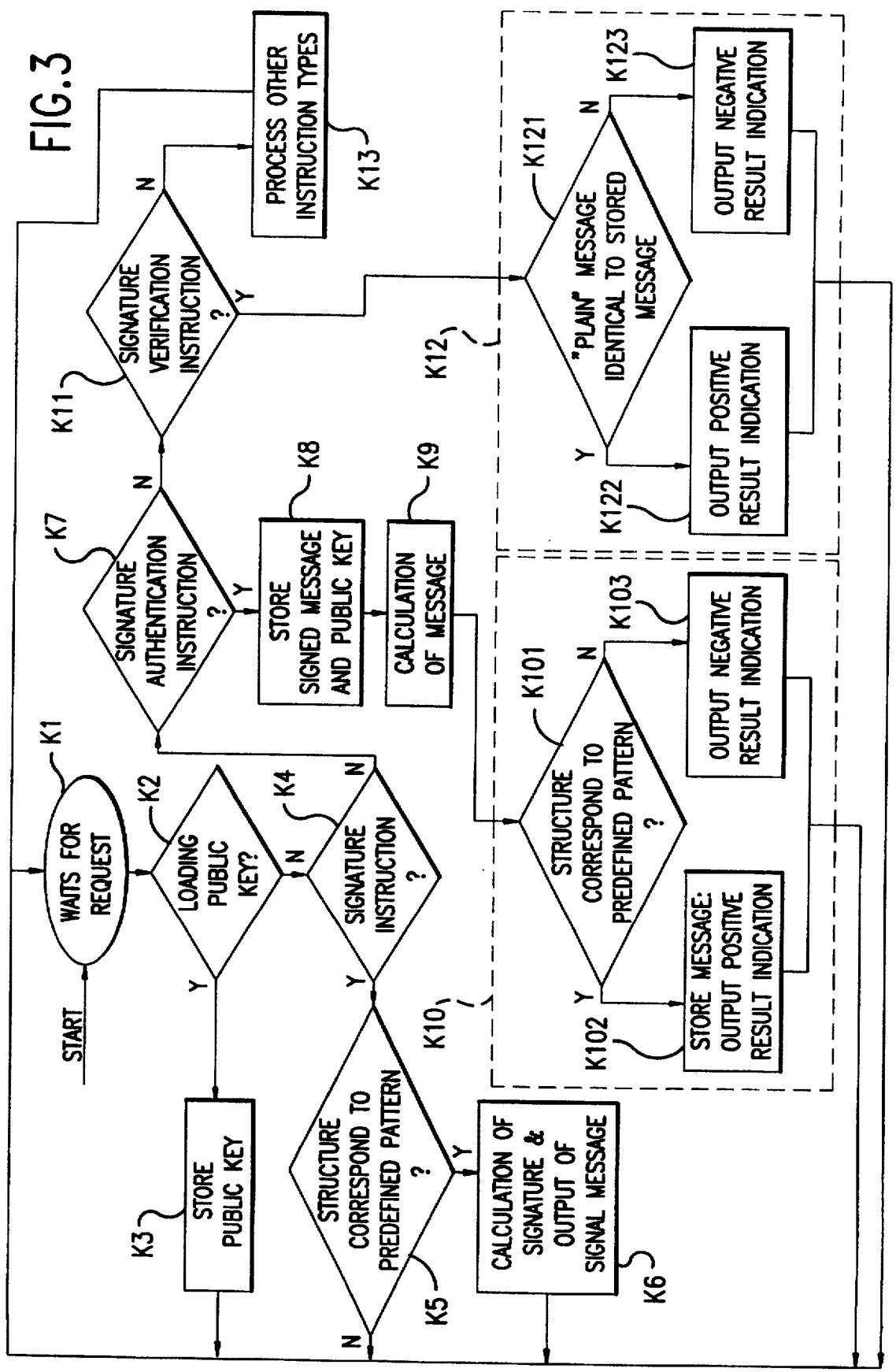

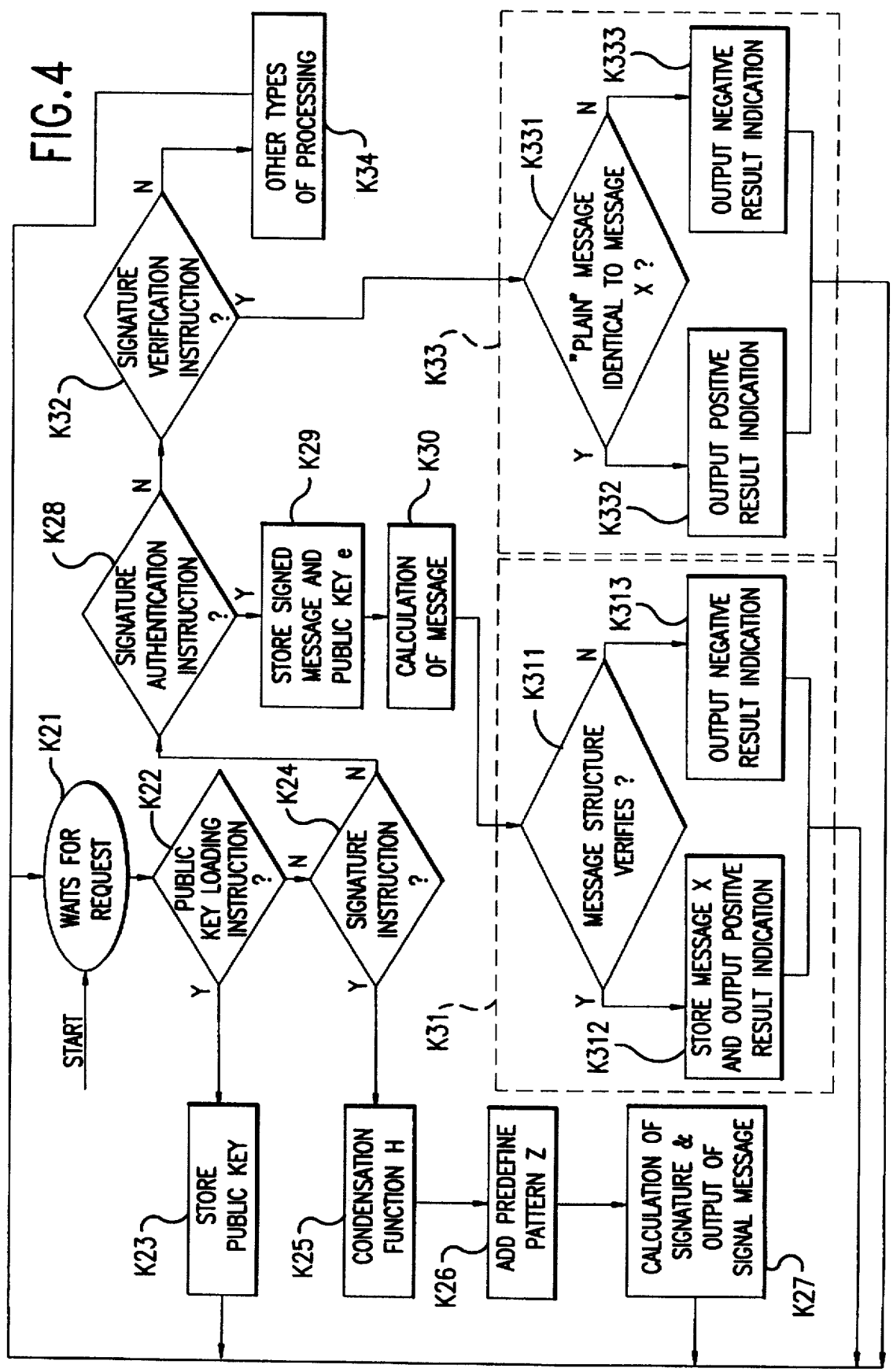

DEVICE FOR IMPLEMENTING A MESSAGE SIGNATURE SYSTEM AND CHIP CARD COMPRISING SUCH A DEVICE

BACKGROUND OF THE INVENTION

The invention relates to a device for implementing, in conformity with an RSA-type protected data exchange system message signature functions and signature authentification functions for signed messages.

The invention finds important applications in the field of cryptographic communications, notably for chip cards.

The RSA protected data exchange system is disclosed in U.S. Pat. No. 4,405,829 in the name of Rivest, Shamir and Adleman, 1978. It is based on the difficulty of factorizing a large number "n" which is the product of two prime numbers "p" and "q". According to this system, the message to be treated is configured as a concatenation of numbers which are separated into blocks of a fixed length which is less than "n". Each block M produces a cryptogram C by means of an exponent "e" which is accessible to the public:

$$C = M^e Mod(n)$$

where Mod(n) indicates that the operation is performed modulo "n". For the decryption of the cryptogram C the addressee must know the secret exponent "d" which satisfies the equation:

$$e \cdot d \, Mod((p-1)(q-1)) = 1$$

in order to perform the following operation:

$$c^d Mod(n) = M^{ed} Mod(n) = M$$

This system also enables signing of the messages and authentification of the signatures. A message M is signed by the sender by using his secret key "d":

$$S = M^d Mod(n)$$

The addressee of the signed message S can then authentificate this signature by using the public key "e" of the sender:

$$S^e Mod(n) = M^{de} Mod(n) = M$$

The technological evolution of chip cards has been such that it is now possible to implement at low cost public key cryptograhic systems (for examples RSA type cryptographic systems) while maintaining a satisfactory performance. Many countries are trying to establish national networks on the basis of chip card technology for applications requiring a high level of security, such as EDI (Echange de Donnees Informatisées), electronic payment systems, banking systems, health systems, etc.

When the cryptographic system used is a strong system in the sense that nobody except the owner of the secret key can decrypt an encrypted message, a part of the capacity of these networks could be diverted to criminal purposes. Therefore, present law in principle prohibits the encryption of data for civil applications.

Therefore, it would be possible to use other cryptographic systems which are limited to the signature functions, such as the DSS (Digital Signature Standard) system which is being standardized in the United States, or the GQ system described in French Patent No. 2,620,248 of Sep. 7, 1987.

However, the RSA-type cryptographic systems have the advantage that they offer a very high security level, that they are widely used in numerous products, and that they can be used, if necessary and authorized, as a data encryption system.

Therefore, it is an object of the invention to make the use of RSA-type an encryption system compatible with existing laws governing civil applications of the chip card.

SUMMARY OF THE INVENTION

To this end, a device of the kind set forth in accordance with the invention is characterized in that it comprises means for inhibiting the message encryption and decryption functions in any RSA-type system.

A first embodiment of a device in accordance with the invention comprises means for comparing each message to be signed with a predetermined structure according to which any message must be built up and for inhibiting the signature of a message which does not comply with said structure.

Thus, a fraud can be prevented from presenting for signing a meaningful encrypted message, and thus from executing a fraudulent decryption operation. Because an encrypted coherent message is neither predictable nor controllable, it cannot comply with said structure.

Moreover, a device in accordance with the invention preferably comprises means enabling, after authentification of the signature of a signed message, comparison of the message obtained with said structure, and output of a positive result indication in the case of correspondence between the two, and a negative result indication if they do not correspond.

Thus, a message obtained after such a signature verification is never output to the outside when the result indication is negative, so that a smuggler will not present a "plain" message for a signature verification operation in order to encrypt the message fraudulently.

A second embodiment of a device in accordance with the invention comprises means for applying a condensation function to all messages before signing, and for subsequently outputting the condensed and signed message, and also the "plain" message, if necessary.

Fraudulent use of the signature function as a decryption function is thus impossible, because the condensation function is applied to the message first.

Moreover, a device in accordance with the invention then advantageously comprises means enabling, after the authentification of the signature of a condensed and signed message, comparison of the condensed message obtained with the "plain" message emitted whereto said condensation function has been applied first, and the output of a positive result indication in the case of correspondence between the two, and a negative result indication if they do not correspond.

Thus, a message obtained after such a signature verification is not output if the result indication is negative.

The invention also relates to a microchip card utilizing an RSA-type protected data exchange system and comprising a device as described in the foregoing paragraphs.

BRIEF DESCRIPTION OF THE DRAWINGS

Other particularities, details and advantages of the present invention will become apparent from the following description which is given, by way of example, with reference to the accompanying drawings; therein:

FIG. 3 shows a flow chart of the operation of a first embodiment of a device in accordance with the invention.

FIG. 4 shows a flow chart of the operation of a second embodiment of a device in accordance with the invention.

DETAILED DESCRIPTION OF THE PREFERRED EMBODIMENTS

Figure 1:
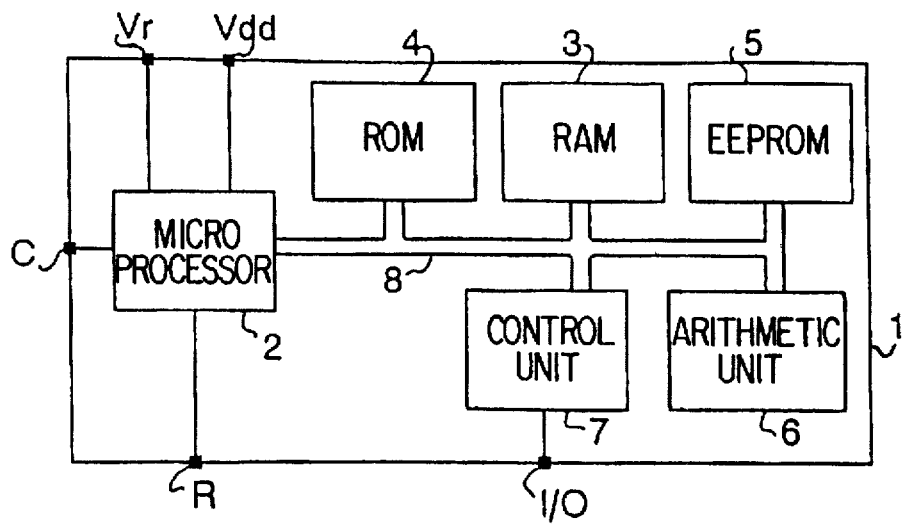
FIG. 1 is a diagrammatic representation of a device in accordance with the invention.

A device in accordance with the invention is realised on the basis of a microcontroller which is protected from a physical point of view, for example the Philips 83C852. A microcontroller 1 of this kind is shown in FIG. 1 and is constructed on the basis of a microprocessor 2, a random-access memory 3, a read-only memory 4 which contains notably operating instructions for carrying out the invention, and a memory EEPROM 5 for storing variant data such as the secret key of the card, the public key of a third party with which it exchanges data, etc. It also consists of an arithmetic unit 6 for the operations necessary for realising the cryptography functions, and a control unit 7 for the inputs/outputs which is also connected to an input I/O of the microcontroller 1. Said elements of the microcontroller 1 are interconnected by way of a bus 8.

The microprocessor 2 is also connected to the inputs R, C, Vr and Vdd of the microcontroller 1, the input R being intended to receive a reinitialization signal for the microprocessor 2; the input C receives an external clock signal, the input Vr receives a reference voltage signal, and the input Vdd receives a power supply signal.

All further details can be found in the specification of the cited microcontroller 83C852.

Figure 2:
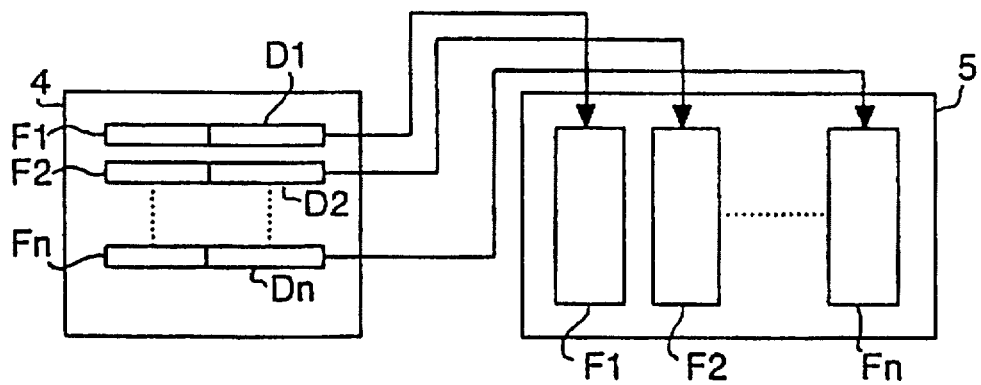
FIG. 2 is a diagrammatic representation of the organization of the memory of a device in accordance with the invention.

As is shown in FIG. 2, for each data file F1, F2 ... Fn in the memory EEPROM 5 the read-only memory 4 comprises a register which contains the name of the file, the type of rights D1, D2, ..., Dn associated with this file, and a pointer to this file in the memory EEPROM 5. Thus, in order to carry out an operation on information of a data file of the EEPROM memory, it is necessary to pass through the microprocessor 2 which checks whether this type of operation on this data is authorized.

For example, the memory EEPROM comprises a file of public keys introduced into the device and a file containing the secret key of the device. The rights associated with this information indicates that they cannot be read from the outside. Moreover, in accordance with the invention the file of introduced keys has a right which limits the access to its data to the signature authentification operations.

This organization of the memory protects the information stored in the device.

In a first embodiment of the device in accordance with the invention, all "plain" messages Mo must comply with a predefined structure. In the example to be described hereinafter, it has been elected to attribute a particular value to the 64 significant bits of each message Mo (the size of the messages processed by the RSA system being taken equal to 512 bits in the present example). The 64 predefined bits are stored in the memory EEPROM 5. In order to facilitate the notation for such a structure, it is advantageous to impart a regular shape thereto, for example "00 ... 0" or "11 ... 1" or "0101 ... 01".

However, it may also be elected to impose a known redundancy on each message Mo, for example by repeating the message or given parts thereof several times.

FIG. 3 shows a flow chart of the operation of this first embodiment of the device in accordance with the invention, the corresponding instructions being stored in the read-only memory 4 of the microcontroller 1.

The meaning of the various blocks of this flow chart is given hereinafter.

box K1: the microprocessor 2 awaits the arrival of a request on the port I/O of the microcontroller 1. The contents of these requests are defined in the documents ISO/IEC 7816-3 and 7816-4, 1993. They also include a field indicating the type of instruction to be executed (loading of the public key into the file of introduced public keys of the memory EEPROM 5, signature, authentification or verification of a signature), and a field comprising the data to be processed. Upon reception of a request, the procedure advances to the box K2.

box K2: test enabling determination as to whether a public key loading instruction is concerned. If this is the case, the procedure advances to the box K3. If not, it advances to the box K4.

box K3: the public key in the instruction data field is stored in the file of introduced keys of the memory EEPROM 5. Subsequently, the procedure returns to the box K1.

box K4: test enabling determination as to whether a signature instruction is concerned. In this case the procedure advances to the box K5; if not, it advances to the box K7.

box K5: test of the structure of the message Mo passed as a parameter of the instruction. If the 64 most-significant bits thereof correspond to the predefined pattern stored in the memory EEPROM 5, indeed a "plain" message is concerned which can be signed without risk of fraud (the signature instruction will not be circumvented in order to realise fraudulent decryption): the procedure then continues with the box K6. If not, the operation is rejected, an error message is transmitted to the terminal (it is actually a response message as defined in the cited documents whose field "statute" which is encoded on two bytes defines the type of error), after which the procedure returns to the box K1.

box K6: calculation of the signature $Ms=(Mo)^d Mod(n)$, and output of this signed message Ms. The procedure subsequently returns to the box K1.

box K7: test enabling determination as to whether a signature authentification instruction is concerned. If this is the case, the procedure continues with box K8. If not, it proceeds to box K11.

box K8: storage in the random-access memory of the signed message Ms passed in the instruction data field, and of the public key "e" to be used which is read in the file of the introduced keys in the memory EEPROM 5.

box K9: calculation of the message $Mo'=(Ms)^e Mod(n)$.

box K10: verification of the structure of the message Mo' obtained (box K101) by comparing its 64 most-significant bits with the predefined pattern stored in the memory EEPROM 5. If no correspondence exists between the two, a negative result indication is output in the box K103 (its format is identical to that of the error message of the box K5). In the case of correspondence, the message Mo' is stored in the random-access memory 3 and a positive result indication is output in the box K102 (it is also a response message as defined in the cited documents whose "statute" field encoded on 2 octets indicates that there is no error, and whose "data" field contains, if necessary, the authentificated message). Subsequently, the procedure returns to the box K1.

box K11: test enabling determination as to whether a signature verification instruction is concerned. In this case the procedure continues with box K12; if not, it proceeds to box K13.

box K12: comparison of the "plain" message, received in the instruction data field, with the message Mo' stored in the random-access memory 3 (box K121). If they are identical, a positive result indication is output (box K122). If not, a negative result indication is output (box K123). Subsequently, the procedure returns to the box K1.

box K13: processing of other types of instruction which are not within the scope of the present invention and which, therefore, are not described herein. Subsequently, the procedure returns to the box K1.

This first embodiment, offering the advantage that it is very simple, relates to the case where the identity of the correspondent is known. Therefore, it is particularly suitable for given applications whose ultimate use is very well determined.

In a second embodiment of the device in accordance with the invention a condensation function is applied to any message before it is signed. Such functions are described in the article "Comment utiliser les fonctions de condensation dans la protection des données", dated Mar. 15, 1988 and published on the occasion of the colloquium SECURICOM, held in Paris in 1988. A translation of the relevant portions of this document which describe the condensation function (or compression function) is annexed at the end of the Description of the Preferred Embodiments. An essential property of such a function is that in practice it is not invertible and that it is impossible to find another message giving the same result.

FIG. 4 shows a flow chart of the operation of this second embodiment of the device in accordance with the invention, the corresponding instructions being stored in the read-only memory 4 of the microcontroller 1.

The meaning of the various blocks of this flow chart is given hereinafter.

box K21: the microprocessor 2 awaits the arrival of a request at the port I/O of the microcontroller 1. The process then advances immediately to box K22.

box K22: test enabling determination as to whether a public key loading instruction is concerned. If this is the case, the process continues with box K23. If not, it proceeds to box K24.

box K23: the public key passed in the instruction data field is stored in the file of the introduced keys the memory EEPROM 5. Subsequently, the process returns to the box K21.

box K24: test enabling determination as to whether a signature instruction is concerned. In this case the process continues with box K25; if not, it proceeds to box K28.

box K25: application of the condensation function H to the message Mo to be signed which has been passed in the instruction parameter.

box K26: the message H(Mo) thus obtained is condensed. In this example the RSA system processes messages of a fixed length of 512 bits. It is thus necessary to complement the message H(Mo), for example by addition of a predefined pattern Z (stored in the memory EEPROM 5), in order to increase its length to 512 bits. Thus, {M'=H(Mo)||Z} is the message obtained (in which the sign || indicates the concatenation operation).

box K27: calculation of the signature $Ms=(M')^d Mod(n)$, and output of the signed message Ms. The process subsequently returns to the box K1.

box K28: test enabling determination as to whether a signature authentification instruction is concerned. If this is the case, the process continues with box K29. If not, it proceeds to box K32.

box K29: storage in the random-access memory of the signed message Ms passed in the instruction data field, and of the public key "e" to be used which is read in the file of the introduced keys in the memory EEPROM 5.

box K30: calculation of the message $M''=(Ms)^e Mod(n)$.

box K31: verification of the structure of the message obtained (box K311): it must have the shape X||Z, where Z is the predefined pattern stored in the memory EEPROM 5. If this is not the case, a negative result indication is output (box K313). If not, the message X is stored in the random-access memory 3 and a positive result indication is output (box K312). The process subsequently returns to the box K1. This authentification is a first check to ensure that the message Ms passed as a parameter is effectively a message signed by the secret key corresponding to the public key "e".

box K32: test enabling determination as to whether a signature verification instruction is concerned. In that case the process continues with box K33; if not, it proceeds to box K34.

box K33: comparison of the "plain" message received in the instruction data field, whereto the condensation function H has been applied first with the message X stored in the random-access memory 3 (box K331). If they are identical, a positive result indication is output (box K332). If not, a negative result indication is output (box K333). Subsequently, the process returns to the box K1.

box K34: processing of other types of instructions which are not within the scope of the present invention and which, therefore, are not described herein. Subsequently, the process returns to the box K1.

Even though the first embodiment offers entirely satisfactory results, it is often necessary to have enhanced protection available. Such enhanced protection is obtained in this second embodiment, notably as regards the signature, because it utilizes a condensation function. It also offers the additional advantage that it allows for the use of the public key certificate concept (defined in the CCITT Recommendation X509) in order to verify the origin of the public key to be used for authentification of a signed message.

Actually, any user A in possession of a device in accordance with the invention has available, stored in its EEPROM memory, a public key certificate $C_A$, signed by the authority AS of the system, and public parameters $PP_A$ defined as follows:

$$C_A = [H(PP_A)]^{d_{AS}} Mod(n_{AS})$$

where $PP_A = Id_A ||e_A|| Val_A || n_A || \ldots$
in which:

$PP_A$ are the public parameters of the user A,

H is the condensation function, $Id_A$ is an identifier of the user A, $Val_A$ is the date of validity of the public key $e_A$ of the user A, the dots indicate that other parameters, if any, can be taken into account, $n_A$ and $n_{AS}$ are the modulo of the user A and the authority AS, and $d_{AS}$ is the secret key of the authority AS.

Thus, when the user A dispatches a signed message to the user B, he also sends his public parameters $PP_A$ in plain writing and also his public key certificate $C_A$. The user B can then authentificate the public key certificate $C_A$ of the user A by carrying out the following procedure:

application of the condensation function H to the public parameters $PP_A$.

calculation of: $T = C_A{}^{e_{AS}} Mod(n_{AS})$, where $e_{AS}$ is the public key of the authority AS, safely available in in each device, followed by comparison of the message T obtained with $H(PP_A)$. In the case of correspondence, the public key $e_A$ of the user A and its modulo $n_A$ are authentificated, and the user B can use them for authentification of a signed message as has already been described.

This method of authentification of the public key of a user A by a user B actually consists in applying the described signature authentification function to the public key certificate $C_A$, and the described signature verification function to the public parameters $PP_A$.

This second embodiment of the device in accordance with the invention thus offers the additional advantage that it enables verification of the authenticity of the public keys of the users before authentification and verification of the signatures.

In another embodiment, the decryption function is authorized only for given users. To this end, it suffices to associate with each secret key a criterion for use for the decryption which is limited to these users, and:

for the first embodiment: to add to the box K10, before the testing of the structure of the message obtained, a test for the value of this criterion for use, so that the structure of the message obtained is verified only if the decryption operation is inhibited, for the second embodiment: to position a decryption instruction in the box K34, the execution of said instruction being subordinate to a test of the nature of the criterion for use of the secret key contained in the secret key file of the memory EEPROM 5.

Figure 5:
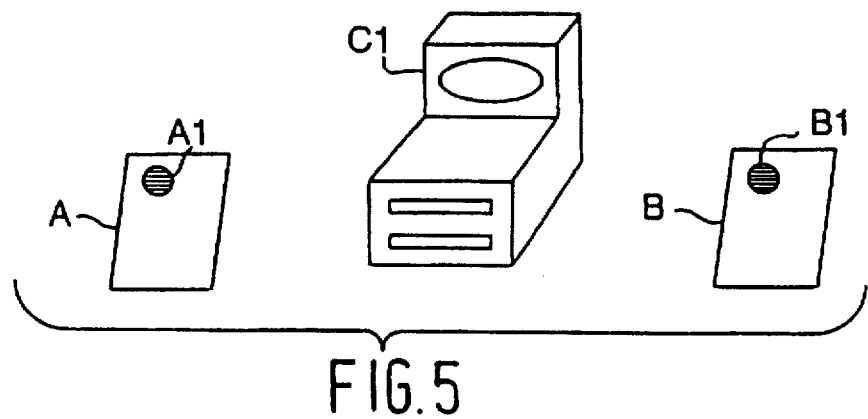
FIG. 5 is a diagrammatic representation of a chip card comprising a device in accordance with the invention.

FIG. 5 shows a data exchange system comprising two chip cards A and B, each of which is provided with a device 1A and 1B in accordance with the invention. The respective holders of these two chip cards communicate via a terminal C1.

Health systems form an example of a practical application of such a system: the personal card of the patient, being the card A and that of the health professional looking after the patient's file, formed by the card B, exchange information via the terminal C1 which is located at the doctor's premises.

In Table 1 an example is given of the exchange protocol between these three elements, i.e. for the second embodiment of the device in accordance with the invention (I1, I2, I3 and I4 are the positive or negative result indications dispatched by the card B to the terminal C1 after each operation).

Evidently, modifications are feasible for the described embodiments, notably in respect of the substitution of equivalent technical means, without departing from the scope of the present invention.

The following is a translation of the relevant portions of "Comment Utiliser Les Fonctions De Condensation Dans La Protection Des Donees" which is discussed above.

1. INTRODUCTION

In this day and age, the support media for computerized data storage or exchange have become commonplace. A 300 Mb file can be stored on a simple cassette and a common telephone line can transmit this file a great distance at an acceptable rate of 9.6 Kb/s. The counterpart is that this data circulates in an environment that is becoming more and more hostile, open to sources of error aid, worse, malevolent tampering. This poses the problem of the protection against modification of this data, be it accidental (errors) or intentional (tampering).

Before the advent of computers this type of problem was easily solved. The main reason being that messages were exchanged in plain language (therefore highly redundant). The very nature of these messages protected them from error without the need for additional control coding. For example, a message such as "The SECURICOM conference will gather the most eminent exerts in the field of security . . . " was easy to correct for anyone familiar with the English language. Even today, people using the telex network apply their skills in this sort of exercise.

As regards tampering, all that was necessary to detect it was to code the message using a reasonably reliable algorithm. Thus, anyone not in possession of the decoding key was unable to modify the message without being detected since the resulting decoded message had every chance of being gibberish (something like "kjmokr zx vcxt oiiou").

Of course, these rule-of-thumb error correction and tampering detection methods are considered today to be inadequate and other more efficient and automated methods must be used. Nevertheless, the key concepts of these ancestral methods are still applicable today; a fraudulent or accidental modification of a message is still detected by the highly probable loss of it's initial coherence. Since, on the other hand, the nature of computerized data is so diversified that it can no longer be assumed to originate from a redundant source, even when it does, it seems that the fight against fraud and errors depends on the adjunct to the message of an artificial control code which needs to be carefully defined.

Thus, message errors can be detected (and sometimes corrected) by tagging on a few control bits that have been computed using appropriate coding. The choice of this coding depends on the transmission or storage medium and the degree of security required (the acceptable quantity of residual errors). The control code can be a simple parity bit or several control bytes obtained by the use of cyclical coding.

If a message containing control bits is now ciphered we obtain an efficient method to guard against manipulation since, upon deciphering, the coherence between the message and its control bits will no longer exist. This relies on a careful choice of the control bit calculation method. Specifically, an error detection/correction code is not necessarily appropriate in this case. All depends on the coding algorithm and the way it is used.

However, in many cases and for various reasons, ciphering messages that are not confidential is undesirable. The control codes must then be computed differently, invoking alternate functions. Nonetheless, one thing is clear: tampering cannot be parried unless the control codes themselves are protected against manipulation (otherwise the hacker, who is assumed to be reasonably clever, will modify the message and the control codes so as to preserve their coherence). In most cases, guarding against tampering will be achieved by including a secret element in the control code computation.

This article presents a survey of control code computation methods that provide protection of ciphered and unciphered messages. Since, for space-saving reasons, short control codes are favoured (32 or 512 bits, regardless of the length of the protected message) these methods are often referred to in France by the generic term 'compression functions'.

2. PROTECTING DATA FROM TAMPERING

2.1. Without Secret Keys

Peter has just created a data file on his personal computer. Since this file is not protected, Peter fears that an ill-willed colleague will tamper with it, altering, for example, the data: "I owe Paul F3.47". To detect any such alteration, Peter will compute a control code C from his file using a compression algorithm H which he has found in a popular book, on cryptography. The algorithm will be run reasonably fast by a Basic programme on Peter's hard disk. Peter then jots down the resulting control code on a slip of paper which he places in his pocket. The following day, he re-computes the control code C and compares it with the one he jotted down the previous day.

If these numbers are unequal Peter assumes his file has been tampered with. He will need to fetch the back-up floppy he had carefully placed in the company safe. If, on the other hand, both numbers are equal Peter will assume his file has not been tampered with, even though this proof is not absolutely reliable. In view of the limited size of the possible control codes ($2^{64}$ if C is 64 bits long) as compared to the number of all possible files (hardly computable, but colossal), it is highly probable that a great number of files would have a control code identical to the one associated to Peter's file. The compression algorithm H will need to have been specified in such a manner that no one is able to determine any one of these 'brother' files. Failing which, all Paul would need to do is to compute C (which would be easy since Peter's file is not ciphered and the compression algorithm H is universally known) and replace the data; "I owe Paul F13.47"). The algorithm specified above will, from now on, be referred to as a 'hash-function'.

If Peter now wants his friend Mary to be aware of the contents of this file, all he need do is to transmit the file via any data transmission network (including a network with no security provisions). Peter can verify the transmission's integrity by phoning Mary and giving her the value of the control code. Since Mary recognizes Peter's voice she will have no doubts concerning the validity of the information she has received. If Mary computes a control code value identical to the one Peter gave her, she will feel confident that the file she has received has not been tampered with and is error-free. [DP3]

2.2. Shared Secret Keys

The preceding paragraph demonstrates that a control code can be shared without the use of secret elements. However, the use of such 'manual' methods is obviously limited. In practice, since control codes use the sane transmission channels as the data they protect, the use of a secret element becomes necessary.

Let us suppose that Peter, not wanting to carry around slips of paper, prefers storing his file and its control code on his computer. He must then use a secret key, either to cipher his entire file as well as its control code, or to simply compute the control code, leaving the file in readable form. In either case, Peter can memorize the secret key or store it somewhere safe (on a magnetic card, for instance).

If the file is ciphered (with a symmetrical ciphering algorithm), a control code must be appended to the file before ciphering so that, when the file is deciphered, tampering can be detected by the loss of coherence between the file and its control code. The above is called an MDC (Manipulation Detection Code) and care must be taken as to its selection.

With unciphered files, the secret key is only used to compute the control code. Such a control code is often referred to as an MAC (Message Authentication Code). An MAC can also be used to protect a ciphered file.

Let us now suppose that Peter wishes to communicate his file to Mary but does not want to use the phone to give her the control code. If the file is confidential, he will transmit it in ciphered form after appending an MDC. If not, he will transmit the file in readable form along with the appropriate MAC (to simplify the following discussion we will assume that the second choice was retained). Obviously, the secret key must have been previously agreed upon, but this broaches the very important subject of key distribution which is not covered here.

As a rule, a key can be shared by several users who mutually trust each other. In this case, the MAC allows the members of such a group to verify that exchanged messages have not been altered by anyone outside the group. This will function properly as long as each member is worthy of belonging to the group. If a member of the group denies having received or transmitted a message which was in fact received or transmitted, the other members of the group will be unable to prove the fraud. Even if the sect key is given to an impartial arbiter, no judgement can be rendered since any MAC computed with this key could have been computed by any member of the group.

This problem (known as non-repudiation) has various types of solutions. In particular, one of these solutions is to assign personalized keys to each member of the group and to 'physically' prohibit the MAC creation module from producing an MAC with any other key but allowing verification to be performed with any of the other keys of the group ([DP3]pp. 273–274).

Now, replacing the 'physical' prohibitor by a 'logical' one leads us to solutions provided by 'public key' algorithms which are covered in the following paragraph.

2.3. Unshared Secret Keys

Peter now wishes to communicate his file to a large audience, using an unsafe channel, and without a secret key, in such a way that each recipient can check the file's origin and integrity. For the last ten years we have been able to meet such requirements. The 'public key' algorithms introduced by Diffie & Hellman in 1976 [DH], the best known of which is RSA [RSA], allow the sender to append electronic signatures to computerized messages.

Let's briefly review the principle governing the RSA algorithm. Let (n,e) be the signatory's 'public key' and d the associated secret key. When message M, having been ciphered as a whole number, is inferior to n, it will be signed $S=M^d$ modulo n. Anyone possessing M and S can verify that $S^e=M$ modulo n. Only the owner of D could have forged S and thus be unable to deny having emitted the signature.

When the message to be signed is equivalent to an integer greater than n, the method most often proposed ([De],[DPI],

[OS]) is to submit the message to a hash-function which will cipher the message to an integer inferior to n, and then apply the secret key to the ciphered result. Note that other methods exist, not (yet) very practical, in which the above steps are performed simultaneously, not sequentially ([A],[GMR], [JC]).

3. CLASSIFICATION

The preceding discussion has delineated three groups of compression functions:
- those which are computed and transmitted using a shared secret element: MACs;
- those dependent exclusively on the message and which are generally associated with a symmetrical ciphering algorithm: MDCs;
- those dependent exclusively on die message and which are generally associated with an electronic signature: Hash-functions.

3.1. General Attributes

Compression functions are used to control the integrity of stored or transmitted data. They must reveal any tampering of the data, bit modifications, inversions of bits, characters or blocks, suppressions or additions of data. Chaining is generally a valid method of obtaining these attributes.

Compression functions do not constitute a direct protection against tampering. A random number, a date or a message number must be added to the message before computing the control code.

In what follows we will assimilate any message to an integer and we will make no hypothesis concerning the possible internal redundancies of the messages that need to be protected.

3.2. The MAC (Message Authentication Code)

The MAC is a control code which relies on the message itself as well as on a secret key which is shared by the correspondents if the message is transmitted. It is used to control the integrity of any ciphered or unciphered data whether the MAC is transmitted using a 'safe' method or via the same channel as the data itself. The authentication phase consists in re-calculating the control code and comparing the result with the one that was transmitted. If equal, the message is reputed to be untampered.

Being produced and checked symmetrically, the MAC ensures, in addition to the message's integrity, a certain degree of authentication in as much as it is necessary to possess the secret key to forge the MAC (although it will not provide protection against repudiation since the recipient himself could forge the MAC).

Two cases must be considered:

The data is in readable form:

If the transmission medium is not 'safe', the protection of the MAC relies entirely on the secret key. Without knowledge of this key, the hacker can attempt to produce a forged MAC. To avoid this, outputs must be unpredictable and this can be checked by using tests derived from the $\chi^2$ test such as those employed by ciphering algorithms. Peter can transmit a control code after his message enabling Mary to be convinced of the integrity of the received message.

The backer might also attempt to break the secret key by analysing multiple message/MAC couples. To protect oneself from exhaustive cyclical key-breaking attempts, as in the case of ciphered messages, the secret key must be sufficiently long.

If the transmission channel is 'safe' the hacker cannot modify the MAC. If he wants to modify the message, he would have to manage to leave the MAC unchanged without possessing the secret code or even knowing the MAC itself. All that is required of the MAC is that it be sufficiently long to ensure that any modification of the message will, in all probability, modify the MAC.

The data is in ciphered form:

In this case one would lend to use an MDC (see this chapter) i.e. a control code that depends solely on the message. However, if a high degree of security is required, as in cases where the ciphering, algorithm is vulnerable to certain types of aggression, one can use an MAC which relies on a secret key that is different from the one used to cipher the data, before or after such ciphering. In the first case the MDC will protect the ciphered message and in the second case, the readable message. This second case is the safest since the hacker will have to forge the message as well as the corresponding MAC, if he has access to it (otherwise the forged message and the readable message would need to have the same MAC, which, by definition, he does not possess all of this without knowing either of the two secret keys. However, this method complicates the key management system which is already quite complex.

3.3. The MDC (Manipulation Detection Code)

An MDC is usually used to protect data that is destined to be ciphered. It is wholly based on the data to be controlled and will be closely dependent on the ciphering algorithm that will be used.

Aggression attempts are linked to both the nature of the MDC and that of the algorithm. Even if the hacker is in possession of the readable message he will generally be unable to forge $E_k$ (M,MDC).

The following method has been proposed ([DP3], [JMMI]); the message is split up into ciphered 64 bit blocks by the DES in ECB mode. The bit by bit sum of all the blocks it used as an MDC. This method is unsatisfactory since it allows two blocks to be inverted or one block to be duplicated without affecting the MDC. A better method consists in using the sum modulo $2^{32}$ retaining the carry overs and using the algorithm in CBC mode.

If the data is not ciphered one can transmit (M,$E_k$(MDC)), This is identical to an MAC, but this method can be interesting if a secret key ciphering algorithm is used in other applications since this avoids storing the key to an MAC. In this particular case, the MDC must imperatively have hash-function qualities (see this chapter).

3.4. The Hash-function

The hash-function is used either alone, if the control code is transmitted via a 'safe' medium, or with a symmetrical ciphering algorithm, both resulting in an MAC but with the added advantage of having been computed in two steps or with an electronic signature. This last method is the only one that provides protection against repudiation. The sender will sign a message M by appending Sig(h(M)), where Sig is the sender's secret key which be or she alone can compute. In all cases, given M, it must be impossible to compute M', different from M, in such a way that M and M' have the same control code. The compression function is then said to possess the attribute (P).

This attribute (P) might be insufficient. Let us suppose a hacker has managed to produce two different messages having identical control codes (which is easier than producing a second message having a given control code). In addition, let us suppose that one of these two messages, which we will call M, is to the advantage of the signatory whereas the other, M', favours the hacker. If the hacker can, by underlining the advantages of M to the signatory, extort a signature from him, the hacker is now able to sign message M'. This situation, which can be very unwelcome, must be avoided by ensuring that M and M' cannot have an identical control code. The compression function is then said to possess the attribute (P*). We shall see in paragraph 5.1 how this affects the size of the control codes.

TABLE 1

| CARD A | TERMINAL C1 | CARD B |
| --- | --- | --- |
| signature Mo <---------- | | |
| send $M_{SA}$ ----------> | | |
| request $C_A$, $PP_A$ <---------- | | |
| | | Authentification $C_A$ ----------------> |
| | If I1 positive | Indication I1 Verification $PP_A$ --------------> |
| | | Indication I2 <---------- |
| | If I2 positive | Authenfication $M_{SA}$ --------------> |
| | | Indication I3 <---------- |
| | If I3 positive | Verification $M_{SA}$ --------------> |
| | END | Indication I4 <---------- |

What is claimed is:

1. A device for implementing message signature functions and signature authentication functions for signed messages in an RSA-type protected data exchange system, comprising:

an input source that receives an input; means for inhibiting using the message signature and the signature authentication functions for application to the input; and means for comparing each message to be signed with a predetermined structure required for all coherent messages and for inhibiting the signature of a message which does not comply with said predetermined structure.

2. A device as claimed in claim 2, characterized in that it comprises means for comparing, after authentication of a signature of a signed message (Ms), the message obtained (Mo') with said predetermined structure, and means for preventing the output of the message obtained when it does not comply with said predetermined structure.

3. A device as claimed in claim 1, characterized in that it comprises means for applying a condensation function (H) to all messages (Mo) before signing, and for subsequently outputting the condensed and signed message (Ms), and also the "plain" message (Mo), if necessary.

4. A device as claimed in claim 3, characterized in that it comprises means for comparing, after authentication of a signature of a condensed and signed message (Ms), the condensed message obtained (X) with the "plain" message emitted (Mo) whereto said condensation function (H) has been applied first, and means for preventing the output of the "plain" message when the means for comparing finds non-correspondence.

5. A device as claimed in claim 4, characterized in that said means are used to implement the public key certificate ($C_A$) concept and public parameters ($PP_A$) in order to authenticate the public keys received ($e_A$, $n_A$).

6. A device as claimed in claim 1, characterized in that a criterion for use is associated with each secret key in order to enable the authorization of the decryption function for a restricted number of users.

7. A chip card, utilizing an RSA-type protected data exchange system, characterized in that it comprises a device as claimed in claim 1.

8. A chip card, utilizing an RSA-type protected data exchange system, characterized in that it comprises a device as claimed in claim 1.

9. A chip card, utilizing an RSA-type protected data exchange system, characterized in that it comprises a device as claimed in claim 2.

10. A chip card, utilizing an RSA-type protected data exchange system, characterized in that it comprises a device as claimed in claim 3.

11. A chip card, utilizing an RSA-type protected data exchange system, characterized in that it comprises a device as claimed in claim 4.

12. A chip card, utilizing an RSA-type protected data exchange system, characterized in that it comprises a device as claimed in claim 5.

13. A chip card, utilizing an RSA-type protected data exchange system, characterized in that it comprises a device as claimed in claim 6.

14. A method for implementing, in conformity with an RSA-type protected data exchange, a message signature function, comprising the steps of:

receiving a message to be signed;

comparing the message to be signed with a predetermined structure which is required for all coherent messages; and preventing signature of the message to be signed if the message does not have the predetermined structure thereby preventing the use of the message signature function to decrypt the message to be signed.

15. A method for implementing, in conformity with an RSA-type protected data exchange, a signature authentication function for signed messages, comprising the steps of:

receiving a signed message;

authenticating the signed message;

comparing the authenticated signed message with a predetermined structure which is required for all coherent messages; and preventing the output of the authenticated signed message when it does not have the predetermined structure thereby preventing the use of the signature authentication function to encrypt the signed message.

16. A method for implementing message signature functions in an RSA-type protected data exchange system, comprising:

receiving a message to be signed;

applying a condensation function to the message to be signed to create a condensed message;

conforming the condensed message to a predefined pattern thereby preventing the use of the message signature function;

signing the condensed message; and outputting the signed condensed message.

17. The method in accordance with claim 16, further including the step of outputting the message to be signed.

18. The method in accordance with claim 17, wherein a signature authentication is performed on the signed condensed message by performing the further steps of:

authenticating the signed condensed message;

comparing the authenticated signed message with the message to be signed whereto said condensation function has been first applied; and preventing the output of the message to be signed if the step of comparing results in non-correspondence.

19. A device for implementing, in conformity with an RSA-type protected data exchange, a message signature function, comprising:

means for receiving a message to be signed;

comparison means for comparing the message to be signed with a predetermined structure which is required for all coherent messages; and means for preventing signature of the message to be signed if the message to be signed does not have the predetermined structure, thereby preventing the use of the message signature function to decrypt the message to be signed.

20. A device for implementing, in conformity with an RSA-type protected data exchange, a signature authentication function for signed messages, comprising:

means for receiving a signed message;

means for authenticating the signed message;

means for comparing the authenticated signed message with a predetermined structure which is required for all coherent messages; and means for preventing the output of the authenticated signed message when it does not have the predetermined structure, thereby preventing the use of the signature authentication function to encrypt the signed message.

21. A device for implementing message signature functions and signature authentication functions for signed messages in an RSA-type protected data exchange system, comprising:

an input source that receives an input;

means for inhibiting using the message signature and the signature authentication functions for application to the input; and means for comparing a signed message obtained after authentication of a signature with a predetermined structure required for all coherent messages; and means for preventing an output of the signed message when the signed message does not comply with the predetermined structure.

22. The device of claim 21, further comprising means for comparing each message to be signed with the predetermined structure and for inhibiting the signature of each message which does not comply with the predetermined structure.

* * * * *